INVENTORS
Michitaka Shimizu
Tatsuyuki Suzuki,
BY Watson, Cole, Grindle & Watson
ATTORNEYS INVENTORS
Michitaka Shimizu
Tatsuyuki Suzuki,
BY Watson, Cole, Grindle & Watson
ATTORNEYS INVENTORS
Michitaka Shimizu
Tatsuyuki Suzuki,
BY Staton, Cole, Grindle & Staton
ATTORNEYS Feb. 3, 1970 MICHITAKA SHIMIZU ET AL 3,493,691

AUTOMATIC SWITCHING SYSTEM

Filed Feb. 23, 1967 5 Sheets-Sheet 4

INVENTORS
Michitaka Shimizu
Tatsuyuki Suzuki,

BY Watson, Cole, Grindle & Watson

ATTORNEYS

INVENTORS
Michitaka Shimizu
Tatsuyuki Suzuki

BY Anton, Cole, Grindle & Watson
ATTORNEYS 3,493,691
AUTOMATIC SWITCHING SYSTEM
Michitaka Shimizu and Tatsuyuki Suzuki, Tokyo, Japan
Filed Feb. 23, 1967, Ser. No. 618,211
Int. Cl. H04m 3/00
U.S. Cl. 179—18 3 Claims

ABSTRACT OF THE DISCLOSURE

This disclosure relates to an automatic telephone switching system which holds connecting lines intact after a call is disconnected so that a new selection process need not be made until a call is made requiring a different route, thus cutting down on central office equipment, the amount of switching required, and the time to place a call, thereby permitting a higher call load through fewer lines. This is accomplished by memorizing the connections and releasing the memory only when a new route need be established.

This application is a continuation-in-part of copending application, Ser. No. 325,424, filed Nov. 21, 1963 now abandoned.

The present invention relates to a selection system for memory devices and information channels to be applied, in particular, to telephone exchanges.

There have been proposed numerous selection systems using electromechanical switching units and control equipment units or control circuits. The mechanical switching units and control units or control circuits repeat call by call operations such as selection, connection and release. In the conventional system, when a call sent out from the previous switching equipment to the incoming circuits provided at the telephone exchange requires the connection to an outgoing route which is the same as the route for the call previously sent by said incoming circuit, the switching equipment must re-establish the connecting operation. In other words, the number of operations of the switching equipment fully corresponds to the number of incoming calls. Therefore, the conventional systems have required the provision of numbers of the connection controlling units or circuits such as a register means, marker means, translating means, etc. in correspondence to the number of calls sent out by the incoming circuits and accordingly, are expensive. Further, since the conventional systems send and receive the address signals for the connection at every call, they are provided with another disadvantage that the holding time of the circuits is made longer by the time of presentation of the address signals.

The present invention relates to the selection system which eliminates such disadvantages as above mentioned provided by the conventional system. According to the present invention tandem switching equipments are provided with memory devices, respectively, memorizing the state of switching path's connection, said memory devices being connected with information channels (separate common signaling channels) in addition to the conventional switching paths and marker means.

An object of the present invention is to provide tandem switching equipment wherein the connecting operations (selection, connection, release, etc.) do not repeat at every call and a communication path which established the connection by another call and includes a switch path from an incoming junctor to an outgoing junctor does not release but is left as it is even after the completion of the call conversation so that said communication path may be appropriated to a next call for the same outgoing route.

Another object of the invention is to provide memory means for holding connections after the completion of each call and releasing only after it is determined that the next call will take another route.

Another object of the present invention is to provide a tandem switching equipment which excludes a trunk circuit provided in the incoming junctor, signaling means and a register sender used in common with these means and further eliminates the common means provided for marker means, decoding means and translating means.

Yet another object of the present invention is to provide a tandem switching equipment wherein the holding time of the call in each communication path is shortened by the time required for the connection, whereby the number of the junctors can be reduced.

A still further object of the present invention is to provide a tandem switching equipment which requires no repetition of selection, connection and release at every one call so that the amount of information which must send out through the common signal channel can be reduced.

The equipment of the present invention can be applied to not only the electromagnetic switching units and control equipment units of relay type but also the tandem switching system consisting of electronic units.

These and other features of the invention will become apparent from the following descriptions with reference to the accompanying drawings, in which.

Figure 4:
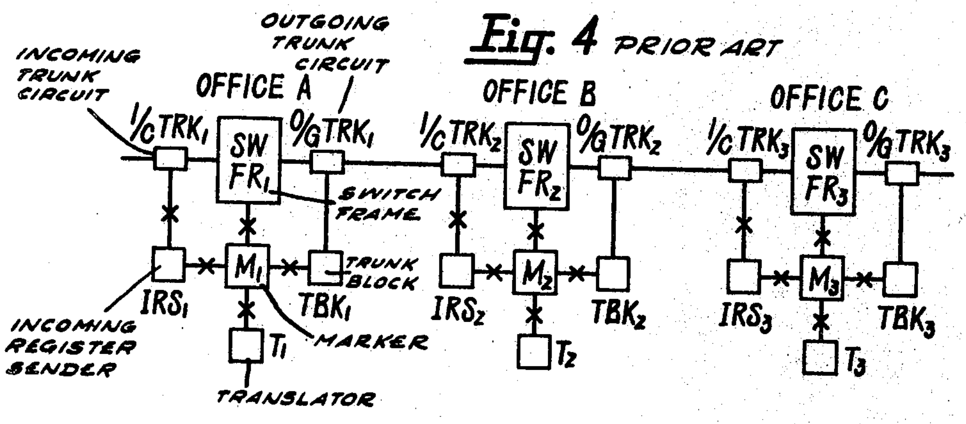
Fig. 4 PRIOR ART
Figure 5A:
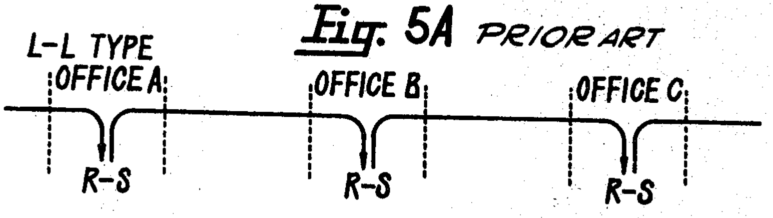
Fig. 5A PRIOR ART
Figure 5B:
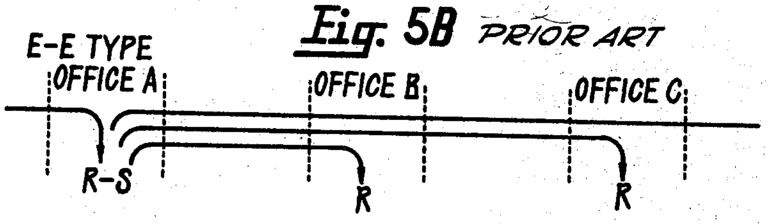
Fig. 5B PRIOR ART
Figure 6:
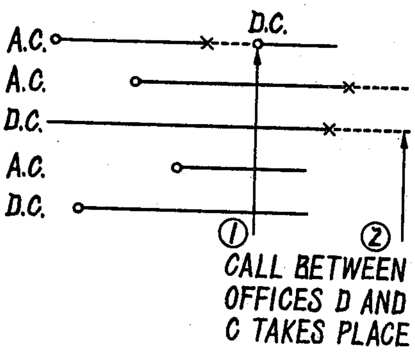
Figure 7:
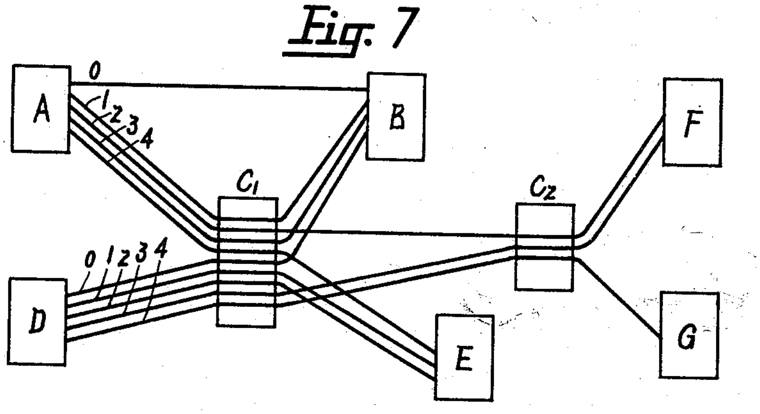
Figure 8:
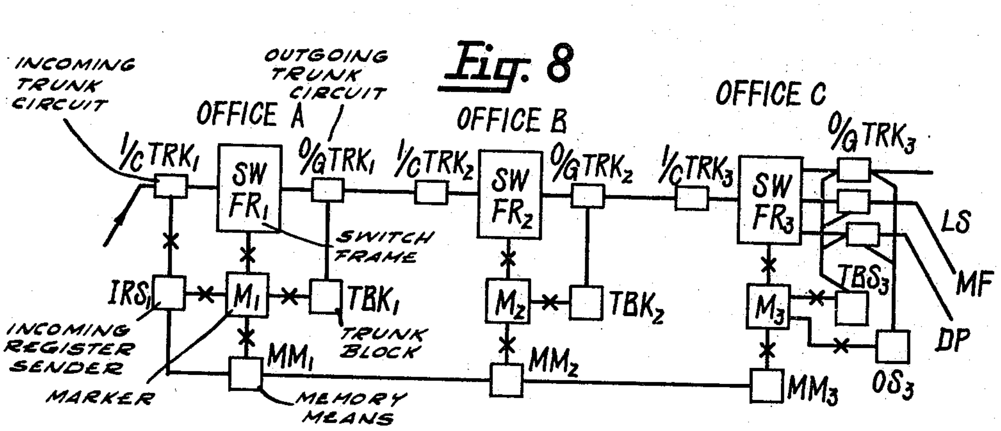
Figure 9A:
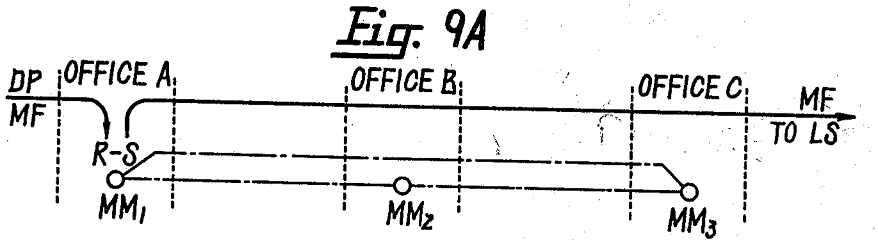
Figure 9B:
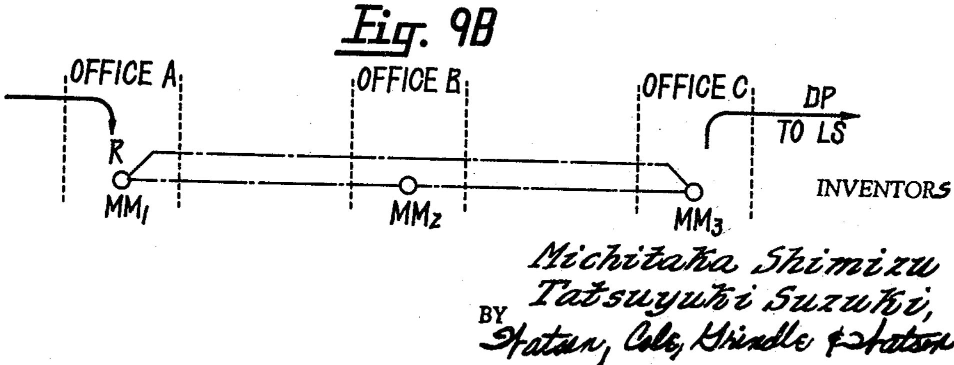
Figure 10A:
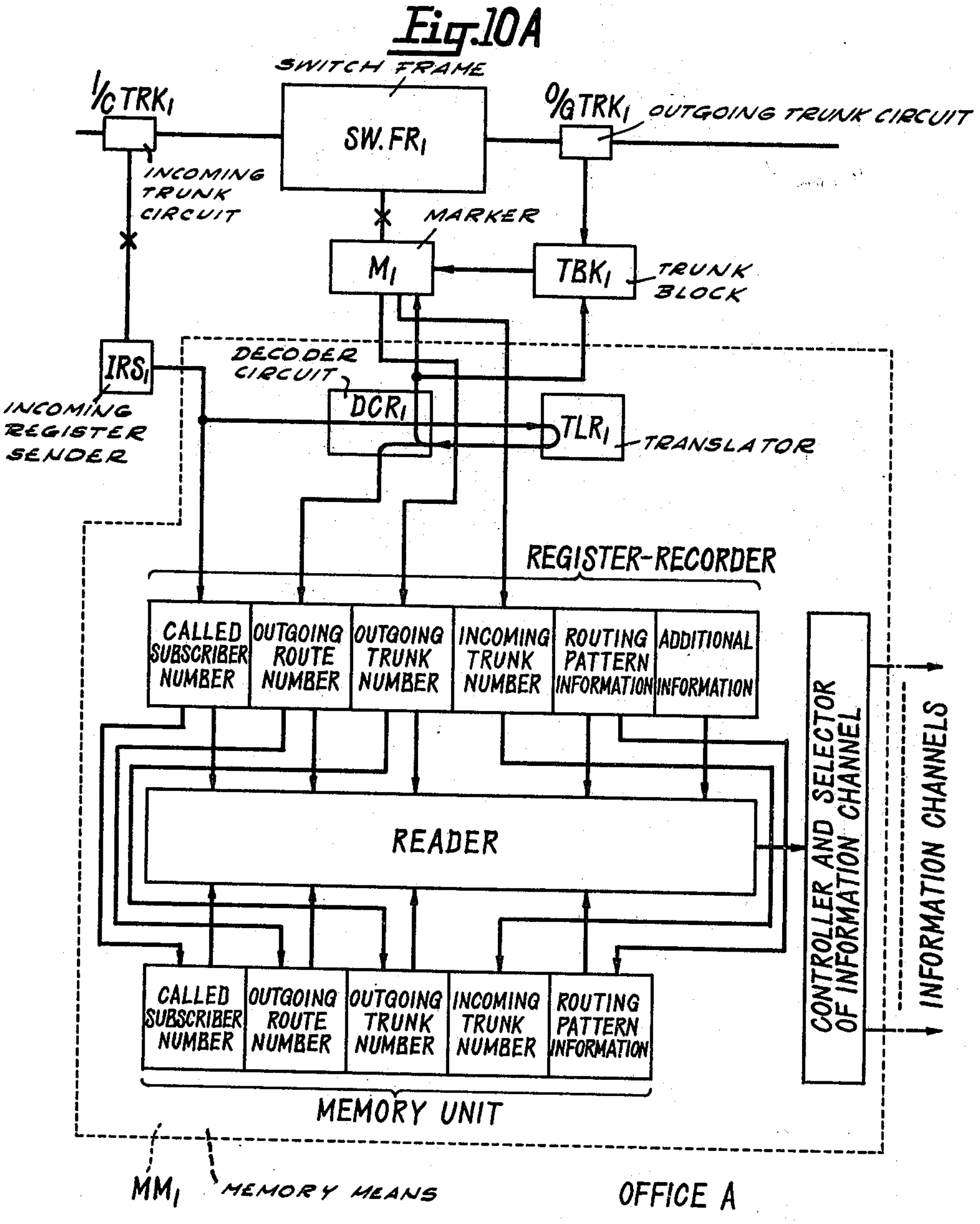
Figure 10B:
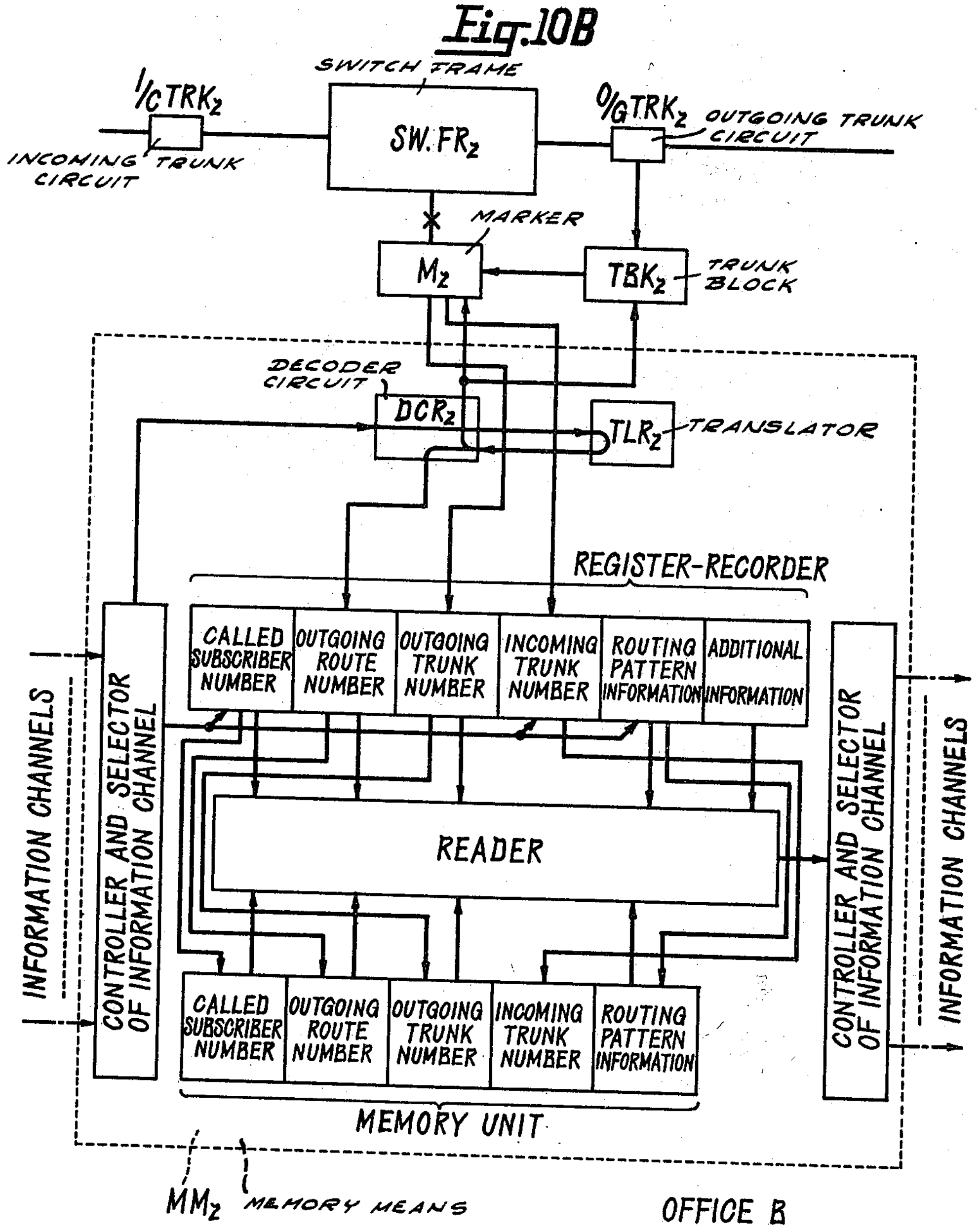

FIGURE 4 is a block schematic diagram showing a conventional tandem switching system, FIGURES 5A and 5B are diagrams showing the manner of sending and receiving signals in the switching system shown in FIGURE 4, FIGURE 6 is a diagram showing a state of the call taking place in each route, FIGURE 7 is a schematic diagram showing an embodiment of a set of connecting routes, FIGURE 8 is a block schematic diagram showing an embodiment of the switching system according to the present invention, FIGURES 9A and 9B are explanatory views showing the manner of sending and receiving signals in the switching system of the present invention shown in FIGURE 8, and FIGURES 10A and 10B are block diagrams showing in detailed form memory means provided by the invention.

Figure 1:
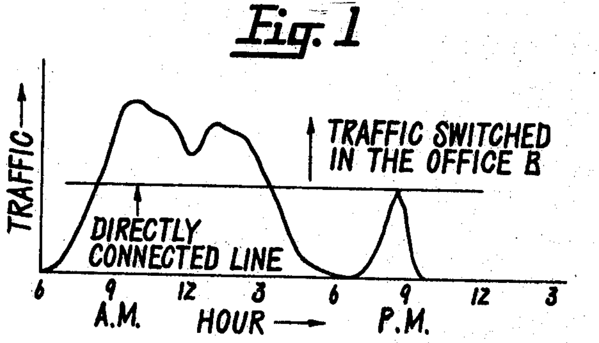
FIGURE 1 is a diagram showing an example of traffic data over a day.
Figure 3:
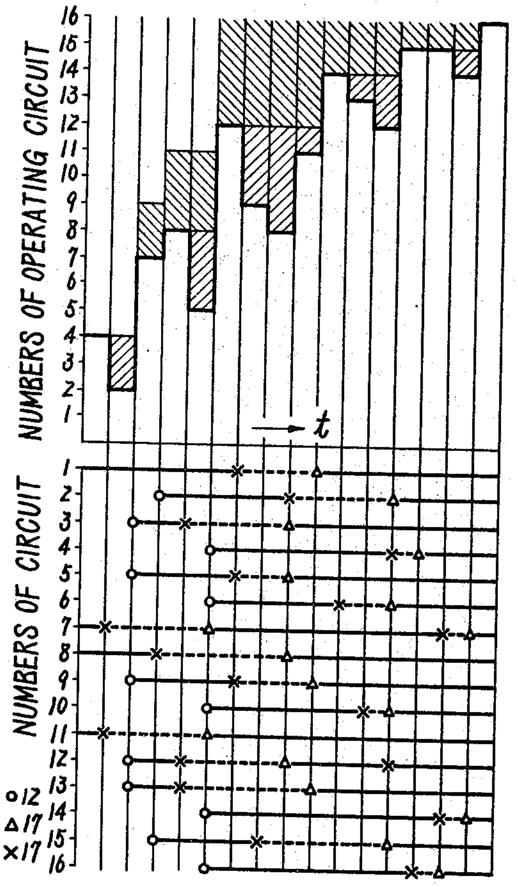
FIGURE 3 is a diagram showing a state of calls of each channel.

In general, the traffic of calls has always fluctuated in volume. The traffic of calls is shown for various hours on FIGURE 1, wherein the traffic becomes maximum during 9:00–12:00 and 2:00–3:00 periods. Now, let us assume that these maximum traffic loads correspond to the traffic between the offices A and C shown in FIGURE 2. As shown in FIGURE 1, the calls are mostly sent out from the office A directly to the office C, whereas other calls are sent out through an office B. In the conventional system, therefore, the switching equipment in the office B is required to repeat the connecting operation at every successively incoming call between the offices A and C. FIGURE 3 shows diagrammatically the repeated connecting operation, a part of which is enlarged. In FIGURE 3, marks ○ and Δ indicate the connecting operation. A mark × denotes the releasing operation. A full line denotes a circuit being used. FIGURE 3 shows 12 ○ marks, 17 Δ marks and 17 × marks. Therefore, the conventional switching equipment is required to carry out 29 connecting operations and 17 releasing operations.

Figure 2:
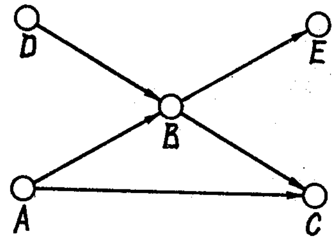
FIGURE 2 is a diagram showing an embodiment of a simplified tandem network of telephone exchange.

In the actual telephone network the office B must connect not only the calls between the offices A and C but also the incoming calls from the office D and the outgoing calls to the office E. Therefore, the connections through the office B of FIGURE 2 are as follows:

$$A \rightarrow C$$
$$A \rightarrow E$$
$$D \rightarrow C$$
$$D \rightarrow E$$

In these respective connections the traffic of the calls increases and decreases individually. In general, a phase of the traffic in one connection is different from a phase of the traffic in another connection. Thus, it frequently happens that the traffic of calls in the connection between the offices A and C is maximum, whereas the traffic of calls in the connection between the offices D and C is minimum. In the prior art the number of circuits between the offices B and C has been calculated on the basis of the sum of an excess of the traffic of calls between the offices A and C (which passes over the route ABC) and the traffic of calls between the offices D and C.

We intend to obtain the number of the circuits calculated on the basis of an average traffic in the mean busy hour so as to maintain the service at not lower than a certain probability of loss (for instance, 1/100).

FIGURE 3 shows a diagram of the number of calls at different times placed between only the offices A and C. However, since the circuit between the offices B and C must send out also the calls between the offices D and C, it requires the same circuit for said calls from either A or D.

FIGURE 4 shows a block diagram of a tandem switching by a conventional crossbar switching equipment for a connection from the office A to the office C through the office B. In such a case, if a Link-by-Link system such as is referenced in FIGURE 5A is adopted, the numerical signal for a calling subscriber designating the office C should be received first by an incoming register-sender means $IRS_1$ through an incoming trunk circuit $I/CTRK_1$ of the office A. In the register-sender means $IRS_1$ of the office A, the first 1 to 5 digits of this received signal will be transmitted to a translator means $T_1$ through a marker means $M_1$ and information to select an outgoing trunk circuit $O/GTRK_1$ will be obtained. A busy test of the outgoing trunk circuit $O/GTRK_1$ will be made by the marker means $M_1$. TBK is a trunk block means to select the busy test lead wires of the outgoing trunk circuits of the required route and to lead them to the marker means. The incoming trunk circuit $I/CTRK_1$ will be connected with the outgoing trunk circuit $O/GTRK_1$ through a switch frame $SWFR_1$ then the speech path will be connected to the office B. Therefore, the numerical signals will be sent out to the office B from the incoming register senders $IRS_1$ of the office A and will be received and stored in an incoming register sender $IRS_2$ through an incoming trunk circuit $I/CTRK_2$ of the office B. In the switching equipment of the office B, after the same operation as the above described operation of the office A, the connection will be extended in the same manner to the office C and the numerical signals will be sent out to the office C from the incoming register-sender $IRS_2$ of the office B and will be received and stored in an incoming register-sender $IRS_3$ through an incoming trunk circuit $I/CTRK_3$ of the office C. The switching equipment of the office C will operate in similar manner and a speech path will be thereby extended to the next office and the numerical signals will be sent through the speech path.

Thus, a speech channel will be completed between the calling party and the called party. When the conversation carried through the speech path is finished and the calling party hooks on the receiver, the originating office will release the connection to the office A, therefore the switching path of the office A will be disconnected and then the switching path of the offices B and C will be also disconnected.

FIGURES 5A and 5B show two systems for transmitting the numerical signals in the conventional crossbar tandem switching equipment, respectively.

FIGURE 5A shows a signal transmitting system of Link-by-Link type, wherein the signals are sent and received at every tandem exchange by the register sender means. FIGURE 5B shows a signal transmitting system of End-to-End type, wherein the signals are successively sent from the office A directly to the offices B and C. This system is the same as the above Link-by-Link system in respect of the manner that a switching path is completed in the office A and then a speech path to the office B is made. In the End-to-End system the numerical signals of the digits necessary for selecting the outgoing junctor in the office B are sent out from the incoming register sender $IRS_1$ of the office A to the incoming register sender $IRS_2$ of the office B, whereby the switching path in the office B is completed and the speech path to the office C is made and then the numerical signals of the digits necessary for selecting the outgoing junctor in the office C are sent out from the incoming register sender $IRS_1$ of the office A to the incoming register sender $IRS_3$ of the office C. The speech path from the calling party to the called party is thus completed and the subsequent operations will be the same as that of the Link-by-Link system.

As explained above, in the conventional tandem switching, whenever a call takes place, the numerical signals will be stored and sent out by the incoming register sender means IRS. Therefore, the incoming register sender means IRS must be provided at each switching point so as to be accessible to all incoming junctors. Thus, a very large floor space is required for the switching equipment. Moreover, whenever a conversion is finished, the switching path will have to be disconnected. Even in case the next incoming call is of a switching path in the same outgoing route, the common equipments, i.e. register-sender means, marker means, translator means, etc. will have to be operated again. Therefore, the number of the common equipments must be large. The tandem switching system of the present invention is to improve the above mentioned disadvantages. As can be seen from the above, the present invention solves solves the uneconomical problem in the time and cost of repeating the call-by-call connecting operation, which is necessitated by release of the common equipments even if a call is in the same outgoing route as of the precedent call.

FIGURE 6 shows a representative state of the circuits between the offices B and C occupied with the conversations from the office A to the office C and from the office D and the office C. In FIGURE 6 a mark ① indicates the state when a call from the office D to the office C takes place. All speech paths connected between the offices D and C through the office B are busy while the speech paths connected between the offices A and C through the office B are idle so that the speech path from the office A to the office C is disconnected at the office B to establish a speech path from the office D to the office C starting at mark ①. This established speech path between the offices D and C will be kept even after the completion of the conversation and left as being connected until a next call takes place. Further a mark ② indicates that the speech path connected between the offices D and C through the office B is idle and just then a call between the offices D and C takes place. In such case the speech path between the offices D and C is appropriated as it is, and no common equipment of the office B will be required to be operated.

In order to eliminate the call-by-call connecting operation of the common equipments of the office B, each office concerned will have to memorize how far the incoming junctors and outgoing junctors connected through the office B extend.

Referring to FIGURE 7 wherein lines No. 1, No. 2, No. 3, and No. 4 from the office A are connected: $A \rightarrow C_1 \rightarrow B$, $A \rightarrow C_1 \rightarrow C_2 \rightarrow F$, $A \rightarrow C_1 \rightarrow B$ and $A \rightarrow C_1 \rightarrow E$, respectively. Similarly, lines No. O, No. 1, No. 2, No. 3, and No. 4 from office D are connected: $D \rightarrow C_1 \rightarrow B$, $D \rightarrow C_1 \rightarrow E$, $D \rightarrow C_1 \rightarrow E$, $D \rightarrow C_1 \rightarrow C_2 \rightarrow F$ and $D \rightarrow C_1 \rightarrow C_2 \rightleftarrows G$. In case line No. 2 from the office A is busy but the line No. 3 from the office D and the line No. 4 from the office A are idle, if a call from the office A to the office F takes place, the line No. 4 from the office A and the line No. 4 from the office D will be reconnected at the office $C_1$ to establish a speech path of $A \rightarrow C_1 \rightarrow C_2 \rightarrow F$. For this purpose, not only the office $C_1$ but also the offices $C_2$, A and D which have no direct relation to such operation will have to recognize that the above switching operation has been carried out and further recognize on real time the state of connection of the junctors connected to the respective offices.

Thus, the present invention is intended to provide an inexpensive and efficient tandem switching system wherein the memory means and information channels always memorize the state of connection of the junctors connected by the tandem switching equipments.

FIGURE 8 shows a block schematic diagram of a switching system of the present invention. I/CTRK is an incoming trunk circuit. O/GTRK is an outgoing trunk circuit. SWFR is a switch frame to make switching paths between the outgoing and incoming circuits. M is marker means making a connection in the switch frames. TBK is trunk block means to select the busy test lead wires of the outgoing trunk circuits of the required route and lead them to the marker means. IRS is incoming register sender means for receiving, storing and sending out numerical signals. MM is memory means. OS is outgoing sender means for sending out numerical signals. LS is a local switching equipment. MF denotes the use of multifrequency code signaling. DP denotes the use of dial pulse signaling as numerical signals.

Now, if the incoming trunk circuit $I/CTRK_1$ of the office A is seized, it will be connected to an idle incoming register sender means $IRS_1$ which will receive numerical signals. When the digits required to select the outgoing route are stored in the incoming register sender means $IRS_1$ in the office A, $IRS_1$ will seize a marker means $M_1$ and the marker means $M_1$ will transmit the information from the incoming register sender means $IRS_1$ to the memory means $MM_1$ and will obtain information required for the selection of the outgoing trunk circuit. The memory means is composed of a temporary memory device capable of writing-in, reading-out and erasing at any time as required and has a capacity large enough to memorize the above mentioned information for each connection. In accordance with this information, the marker means $M_1$ is to make a busy test of the outgoing trunk circuit through the trunk block means $TBK_1$, to determine one of idle circuits and then connect it with the aforementioned incoming circuit through the switch frame SWFR.

Further, the memory means $MM_1$ of the office A is to memorize the received information as well as the information resulting from this connection and is to transfer them through the information channel indicated between $MM_1$, $MM_2$, and $MM_3$, in FIGURE 8 to the respective switching equipments related with the speech channel established between the selected outgoing circuit and its destination. Now, if, for example, a junctor for the office B is selected and is to be extended to the office C, the informations stored in the memory means $MM_1$ will be transmitted to the memory means $MM_2$ of the office B and, in the office B, following the instruction from memory means $MM_2$, marker means $M_2$ and trunk block means $TBK_2$ will extend the corresponding incoming junctor from the office A to an idle one among the outgoing junctors to the office C through the switch frame SWFR. Such information will be memorized by the memory means $MM_2$ and this information together with the information relating to the outgoing junctor from the office B will be transmitted to the memory means $MM_3$ of the office C. In the office C, too, following the instruction from the memory means $MM_3$, the marker means $M_3$ and trunk block means $TBK_3$ will extend this incoming junctor from the office B to the outgoing junctor to any desired local switching office through the switch frame SWFR and this information is to be memorized in the memory means $MM_3$. As for the manner of connection to the subsequent switching equipments when the terminal of such information channels network is the office C, there are two alternative methods, i.e. a method wherein a called number is received by the memory means $MM_3$ of the office C, through the memory means $MM_1$ and $MM_2$ from the incoming register sender means $IRS_1$ to the office A and dial pulses DP are sent out, through the outgoing trunk circuit $O/GTRK_3$, from the outgoing sender means $OS_3$ of the office C, and a method wherein multifrequency codes are sent out from the incoming register sender means $IRS_1$ of the office A upon receipt of signals fed back indicating that the setting up of the connection to the desired office has been completed. When the information channel network is thus used, no incoming register sender means $IRS_2$ and $IRS_3$ will be required in the offices B and C and therefore the incoming trunk circuits $I/CTRK_2$ and $I/CTRK_3$ will become simple. For example, when the speech paths shown in FIGURE 3 are used, in the conventional system the tandem switching equipment of the office B will be required to repeat 46 releasing operations, whereas in the system of the present invention the tandem switching equipment of the office B will be required to carry out only 12 operations, thus making the number of operation of the controlling means far less than that of the conventional system.

When the call conversation is finished, the speech path from the calling party into the office A and the speech path from the office C to the called party will be disconnected, but the connection of the speech path from the office A to the office C through the office B will be held as it is and the information relating to the state of this connection will be reserved in the memory means MM of each office. Therefore, when a call to the office C or a call to be extended to any other offices through the office C comes successively into the office A, this retained speech path will be utilized as it is. In this case the connection at $SWFR_2$ is still held and a fresh call from the office A to the office C will pass through this connection of the office B. ($O/GTRK_1$–$I/CTRK_2$–$SWFR_2$–$O/GTRK_2$–$I/CTRK_3$). That is to say, the numerical signals received by the incoming register sender means $IRS_1$ of the office A will be passed from the memory means $MM_1$ of the office A via $MM_2$ to the memory means $MM_3$ of the office C through the information channels and in the office C an idle outgoing trunk circuit of the required outgoing route will be selected and connected to the above mentioned speech path by the marker means $M_3$.

Further, when a call to the office B or a call to be extended to any other offices than the office C through the office B comes into the office A and, if there is no other idle outgoing junctor to set up this connection, the already established speech paths to each office will be released, the information in the memory means MM of each office will be erased and then the connection will be set up anew in the same principle as is described above.

The information to be transferred between the memory means MM of the respective offices and the information to be memorized by the respective memory means MM are as follows:

The information which must be transferred from the office A to the office B and then from the office B to the office C are as follows: "originating code," "terminating office code," "called subscribers' numbers" and "outlet numbers."

The information to be received by the memory means $MM_1$ of the office A is as follows: "originating office code," "terminating office code," "called subscribers' number," "incoming route number," "incoming trunk circuit number," "outgoing route number" and "outgoing trunk circuit number."

The information to be memorized in the memory means $MM_1$ of the office A even after the completion of a call-conversation is as follows: "terminating office code" (5 digits), "originating call entry," "outgoing route numbers and outgoing trunk circuit numbers" (6 digits).

The information to be received by the memory means $MM_2$ of the office B is as follows: "originating office code," "incoming route and trunk circuit number," "terminating office code," "called subscribers' number" and "outgoing route and trunk circuit number."

The information which must be memorized in the memory means $MM_2$ of the office B even after the completion of a call-conversation is as follows: "originating office code" (5 digits), "incoming route and trunk circuit numbers" (6 digits), "terminating office code" (5 digits), and "outgoing route and trunk circuit numbers" (6 digits).

The information to be received by the memory means $MM_3$ of the office C is as follows: "originating office code," "incoming route and trunk circuit number," "terminating office code," "called subscribers' number" and "outgoing route and trunk circuit number."

The information to be memorized in the memory means $MM_3$ of the office C even after the completion of a call-conversation is as follows: "originating office code" (5 digits), "incoming route and trunk circuit number" (6 digits) and "terminating call entry."

FIGURES 9A and 9B are line diagrams of signaling routes of the numerical signals based on the present invention. They show that numerical signals received by the office A from preceding offices will be passed to the respective required offices by way of the separate information channels shown as connected with the chain lines between the memory means MM and will be used to set up the connection between the office A and the office C through the office B. And, the numerical signals will be sent out to the switching equipments of local offices (LS) connected with this network from the incoming register sender means $IRS_1$ of the office A or the outgoing sender means $OS_3$ of the office C.

As explained above, the present invention has many advantages in tandem switching, by providing separate information channels through memory means MM between an originating office and a terminating office, switching equipment can be reduced, the number of common means required for the connection in the same route can be decreased and the failure rate of the switching equipment can also be reduced.

FIGURE 10A is a block diagram of an example of the tandem switching equipment, which shows the details of the memory means. If the incoming trunk circuit $I/CTRK_1$ of the office A is seized from the originating office, an idle incoming register-sender means $IRS_1$ will be connected to an incoming circuit through a register link. The address signal indicating the called subscriber number from the originating office is received by $IRS_1$ and transmitted to a decoder circuit of the memory means. $DCR_1$ can detect an outgoing route corresponding to this address signal by means of a translater $TLR_1$ and connects the respective busy test leads of the outgoing trunk circuit $O/GTRK_1$ to a marker means $M_1$. The marker means $M_1$ serves to select an idle outgoing trunk circuit $O/GTRK_1$. The route number and circuit number of thus selected outgoing trunk circuit $O/GTRK_1$ are recorded in the respective register-sender means. If the incoming trunk circuit $I/CTRK_1$ are connected to an outgoing trunk circuit O/GTRK by the switch frame $SW.FR_1$ with the aid of the marker means $M_1$, the outgoing trunk circuit number will be registered in the register-recorder. The called subscriber's number, outgoing route number, outgoing trunk circuit number and incoming trunk circuit number will be registered in the memory unit and, at the same time, the called subscriber's number, outgoing trunk circuit number and additional information will be read by a reader and, then, transmitted to the next office B through the information channels corresponding to the outgoing route number.

The office B (FIGURE 10B) has the same tandem system as of the above mentioned, in which the aforementioned information channel is connected to one of the information channels shown in the left side of FIGURE 10B. The aforementioned information, i.e., the called subscriber's number is registered in a called subscriber's number register in an incoming trunk circuit number register and route pattern information register through the controller. Simultaneously, the called subscriber's number is transmitted also to a decoder $DCR_2$ and in idle outgoing trunk circuit $O/GTRK_2$ of the required outgoing route is selected by the operations of a translator $TLR_2$, trunk block means $TBK_2$ and marker means $M_2$ so that said outgoing trunk circuit $O/GTRK_2$ is connected to an incoming trunk circuit $I/CTRK_2$ through a switch frame $SW.FR_2$. The outgoing route number and outgoing trunk circuit number of this outgoing trunk circuit $O/GTRK_2$ are registered in the respective registers so as to be registered in the memory unit together with the above mentioned called subscriber's number, incoming trunk circuit number and route pattern information.

The operations of the local switching equipment, incoming register-sender means IRS, translator TLR, marker means M and trunk block means TBK are the same as in the conventional telephone exchange system in the principle and they are restored after the completion of the connection between the incoming trunk circuit $I/CTRK_2$ and outgoing trunk circuit $O/GTRK_2$ by means of the switch frame SW.FR. However, the connection by the switch frame SW.FR. will be held as it is even after the completion of a conversation accomplished by said connection of the switch frame as well as in the course of said conversation. Further, each of the above mentioned numbers memorized in the memory unit is also reserved as it is.

If the incoming trunk circuit $I/CTRK_1$ shown in FIGURE 10A is again seized from the originating office by a next call after the completion of the conversation, the register-sender means $IRS_1$ will be connected to the incoming circuit, as aforementioned. The address signals indicating the called subscriber's number from the originating office are received by the register-sender means $IRS_1$ and transmitted to a called subscriber's number register. The called subscriber's number register serves to check up a fresh call with the recorded number of the precedent call memorized in the memory element and in case said fresh call can use the same route as of the precedent call, the connection between the incoming trunk circuit $I/CTRK_1$ and the outgoing trunk circuit $O/GTRK_1$ is held as it is and the previously recorded memory of the called subscriber's number is erased so that a fresh called subscriber's number stored in the called subscriber's number register may be memorized in the memory unit. Simultaneously, said fresh called subscriber's number, outgoing trunk circuit number, outgoing route number and additional information necessary for operation of the controller are read by the reader and transmitted to the office B through the information channel corresponding to the outgoing route number.

In the office B, the called subscriber's number transmitted through the information channel is stored in the called subscriber's number register through the controller, while the outgoing trunk circuit number is stored in the incoming trunk circuit number register and route pattern information register through the controller and checked up with the memorized precedent call numbers in respect of the incoming circuit. As a result, in case the fresh call uses the same outgoing route as of the precedent call, the memory of the outgoing route and outgoing trunk circuit is reserved as it is and only the called subscriber's number is made new and at the same time, the called subscriber's number, outgoing trunk circuit number, outgoing route number and route pattern information and additional information required for operation of the controller are read by the reader and transmitted to a next tandem office such as office B through the information channel corresponding to the outgoing route number.

If the called subscriber's number of the fresh call is checked up with the memorized number of the precedent call and then it requires a different outgoing route, the connection between the incoming trunk circuit I/$CTRK_2$ and the outgoing trunk circuit O/$GTRK_2$ will be once interrupted and then the incoming trunk circuit I/$CTRK_2$ will be connected to the outgoing trunk circuit O/$GTRK_2$ through the switch frame SW/FR by the operation of the decoder $DCR_2$, translator $TLR_2$, trunk block means $TBK_2$ and marker means $M_2$. The state of such connection is memorized in the memory means in the same manner as aforementioned and the information is transmitted to the tandem office of different route through the information channel corresponding to the outgoing route.

Thus, the memory means MM of each office memorizes the state of connection of the circuits so that it makes possible to considerably reduce the number of operations, for example, in case of FIGURE 3, it can be reduced to 12/46. Particularly, for the system using the separate common signaling channels, the system of the present invention can decrease considerably the amount of required information signal so as to increase the number of the speech paths which can be included in one signaling channel, thereby it makes possible to use effectively and economically the tandem switching equipment.

What is claimed is:

1. An automatic telephone tandem switching system coupled between a plurality of offices comprising outgoing trunk circuits, trunk block means for making a busy test of the outgoing trunk circuits, incoming trunk circuits, communication paths interconnecting between the outgoing and incoming trunk circuits of each office, switch frames to connect a switching path between the incoming and outgoing trunk circuits and having a mechanism to keep said switching path connected even after the completion of a call-conversation, memory means storing information identifying the state of connection of the switch frame and instructing the switch frames to keep the switching path connected while the information is stored, marker means operated by the instruction from said memory means to retain the connection between the incoming and outgoing trunk circuits even after the completion of the call-conversation and then to pass a next call over the same route as that of the precedent call when it requires that route, and means interconnecting said memory means and switching equipment to release said path only in response to a call made requiring a different route.

2. An automatic telephone tandem switching system between a plurality of offices comprising outgoing trunk circuits, trunk block means for making a busy test of the outgoing trunk circuits, incoming trunk circuits, communication paths interconnecting between the outgoing and incoming trunk circuits of each office, switch frames with line selection equipment operable to connect a switching path between the incoming and outgoing trunk circuits at each office having a mechanism to retain a selected switching path connected even after the completion of a call-conversation, memory means storing information for retaining the connection said memory means being coupled to disconnect said switching path only when a call going to an outgoing route other than said retained switching path is received, and marker means operated from said memory means and operable with said switch frame to retain the connection between the incoming and outgoing trunk circuits even after the completion of the call-conversation, and, then to release connection and make a new connection only in case a next call requiring a different route from the precedent call comes in and fails to find an idle trunk with a connection to said different route.

3. An automatic telephone tandem switching system claimed in claim 2, wherein said memory means memorizes the state of connection between the incoming trunk circuits and the outgoing trunk circuits of the automatic tandem switching system and said memory means comprises memory units having elements to record the called subscriber's number, outgoing route number, outgoing trunk circuit number, incoming trunk circuit number, route information and other necessary additional information.

No references cited.

KATHLEEN H. CLAFFY, Primary Examiner

WILLIAM A. HELVESTINE, Assistant Examiner